United States Patent Office 3,305,376
Patented Feb. 21, 1967

3,305,376
GELATIN HARDENING COMPOSITION
Donald M. Burness, Stanley W. Cowan, and John A. Ford, Jr., Rochester, N.Y., assignors to Eastman Kodak Company, Rochester, N.Y., a corporation of New Jersey
No Drawing. Filed July 22, 1963, Ser. No. 296,496
10 Claims. (Cl. 106—125)

This invention relates to double ended organic compounds, having terminal bromine atoms, as modifiers in gelatin compositions.

It is often desirable to provide addends to gelatin compositions which serve in more than one capacity. Some compounds only act as hardeners, some as antifoggants in gelatin photographic emulsions and others as sensitizers.

One object of our invention is to provide addends to gelatin which serve as both hardeners for gelatin and as antifoggants when incorporated in photographic emulsions. Another object of our invention is to provide double ended bromine compounds as useful gelatin hardeners. A further object of our invention is to provide compositions of matter composed of gelatin and double ended bromine compounds. Other objects of our invention will appear herein.

We have found that certain double ended bromine compounds for example certain bisurethans, bisureas, bisamides and urethan-ureas having terminal bromo atoms when incorporated in gelatin compositions exert a hardening effect thereon and when used in photographic emulsions serve as antifoggants. In adding these materials to gelatin compositions it is desirable to use an amount sufficient to show a hardening effect when the gelatin composition is coated out in the form of layers. Although amounts as low as 0.1% based on the weight of the gelatin have shown a hardening effect in gelatin layers containing these compounds it is preferable to incorporate 1-6% of the hardening compound (based on the gelatin) in the gelatin composition.

The gelatin hardeners which have been found to be effective in accordance with the invention are as follows:

(1) Bisurethans of the following structure $$BrCH_2CH_2CONHCOO—X—OCONHCOCH_2CH_2Br$$

where X is selected from the group consisting of $(CH_2)_n$, $n$ being 2–6,

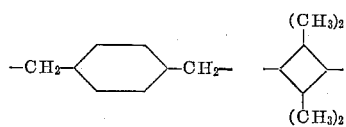

and $$—(CH_2)_2—Y—(CH_2)_2—$$

Y being selected from the group consisting of O, S, SO$_2$, —S(CH$_2$)$_2$S— and —S(CH$_2$)$_2$O(CH$_2$)$_2$S—.

(2) Bisureas of the following structure $$BrCH_2CH_2CONHCO—X—CONHCOCH_2CH_2Br$$

where X is selected from the group consisting of

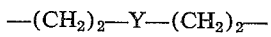

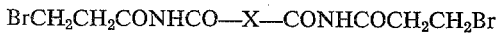

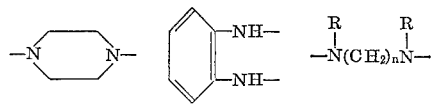

where $n=0-6$ and R is selected from the group consisting of H and alkyls of 1–4 carbon atoms.

(3) Bisamides of the following structure $$BrCH_2CH_2CO—X—COCH_2CH_2Br$$

where X is selected from the same group as designated in (2).

(4) Urethan-ureas having the following structure

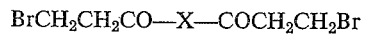

R being selected from the group of H and the alkyls of 1–4 carbon atoms, X is selected from the group of —(CH$_2$)$_n$— and

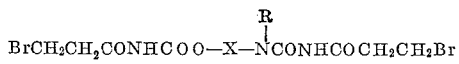

and 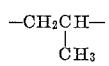 $n=2-4$.

The compounds useful as hardeners in accordance with our invention are double ended type compounds in which the terminal portion of each end exhibit a 3-bromopropionyl structure. The 3-bromopropionyl compounds useful as addends to gelatin in accordance with our invention may be prepared by any convenient method. Some of these compounds are conveniently prepared by the simple acylation of an appropriate diamine with 3-bromopropionyl chloride or bromide. In other cases, the desired hardener may be conveniently prepared by reacting a 3-bromopropionyl isocyanate with an appropriate compound such as a diamine, a dialcohol, an amino alcohol or the like. Johnson and Dublitz in J.A.C.S., 80, 3150 (1958) refers to the reaction of the isocyanate with an alcohol and with an amine to form respectively an urethane (carbamate) and an urea.

The hardeners in accordance with our invention are useful for adding to gelatin-silver halide photographic emulsions in that those compounds exhibit a hardening action in the emulsion layers, have an antifoggant effect and in some cases may even act to increase the sensitivity of the emulsion. However, these addends are also useful in incorporating in other types of gelatin-coating compositions used for photographic purposes such as subbing layers, overcoatings, antihalation layers and the like, where desirable to increase the resistance of the gelatin layer against the effect of water particularly at an elevated temperature. These addends add to the resistance of the gelatin layer to swelling by water and increase the degree of temperature at which the gelatin layer disintegrates when immersed in water, the temperature of which is gradually increased.

The following examples illustrate methods of preparing various compounds which are useful as addends to gelatin compositions in accordance with our invention.

*Example 1*

30.2 grams of 3-bromopropionyl chloride in solution in 50 ml. of ethylene chloride was added dropwise to a mixture of a solution of 9.3 grams of hexamethylenediamine in 300 ml. of ethylene chloride and 7.1 grams of sodium hydroxide in 100 ml. of water at a temperature maintained at 15–20°. This reaction resulted in the formation of a solid which was filtered off and was washed consecutively with dilute HCl, dilute alkali and water and then dried. Recrystallization from ethanol yielded 24.6 grams of N,N'-bis(3-bromopropionyl)hexamethylenediamine as colorless crystals. This material had a melting point of 168.5–170° C.

*Example 2*

The above procedure was repeated except that the diamine used was ethylenediamine. N,N'-bis(3-bromopropionyl)ethylenediamine was obtained as a colorless product after recrystallization from methanol. This material had a melting point of 177.5–178° C.

Example 3

The procedure described in Example 1 was repeated using o-phenylenediamine as the diamine material. N,N'-bis(3-bromopropionyl)-o-phenylenediamine was obtained as a colorless solid having a melting point of 189.5–190° C.

Example 4

N,N'-bis(3-bromopropionyl)piperazine having a melting point of 103–104.5° C. was obtained.

Example 5

A mixture of 350 ml. of dry chloroform, 35.6 grams of N-bromosuccinimide, 2 ml. of allyl chloride and about 5 mg. of benzoyl peroxide was refluxed together for 4 hours after which 4.3 grams of ethylene glycol was added to produce 25 grams of colorless solid which was recrystallized from methanol - N,N - dimethylformamide. The compound obtained which melted at 192–192.5° C., was ethylenebis(3-bromopropionylurethan).

Samples of the compounds prepared above were added to separate portions of a sulfur and gold sensitized high-speed silver bromoiodide-gelatin photographic emulsion which had been panchromatically sensitized with a cyanine dye. Each emulsion sample was coated on a cellulose acetate film support at a coverage of 432 mg. of silver and 980 mg. of gelatin per square foot. Each sample was exposed on an Eastman 1B sensitometer, processed for five minutes in Kodak DK–50 developer, fixed, washed and dried. The results obtained were as follows:

| The Addend Used | Conc., g./100 g. of Gel | Rel. Speed | Gamma | Fog | Percent Swell in Water |
|---|---|---|---|---|---|
| Control | | 100 | 1.27 | 0.17 | 990 |
| Bis(3-bromopropionyl)hexamethylenediamine | 3 | 100 | 1.23 | .13 | 530 |
| Do | 6 | 105 | 1.18 | .14 | 470 |
| Bis(3-bromopropionyl)ethylenediamine | 3 | 83 | 1.03 | .10 | 350 |
| Do | 6 | 80 | 1.15 | .11 | 300 |
| Control | | 100 | 1.18 | .14 | 910 |
| Bis(3-bromopropionyl)-o-phenylenediamine | 1 | 97 | 1.33 | .13 | 610 |
| Do | 3 | 97 | 1.28 | .14 | 800 |
| Control | | 100 | 1.20 | .12 | 659 |
| Bis(3-bromopropionyl)piperazine | 1 | 91 | 1.47 | .10 | 500 |
| Do | 5 | 50 | 1.40 | .09 | 228 |
| Control | | 100 | 1.25 | .13 | 676 |
| Ethylenebis(3-bromopropionylurethan) | 1 | 74 | 1.32 | .08 | 380 |
| Do | 5 | 65 | 1.25 | .08 | 264 |

Other useful addends to photographic emulsions in accordance with our invention are the following:

(6) Tetramethylenebis(3-bromopropionylurethan)
(7) Hexamethylenebis(3-bromopropionylurethan)
(8) Trans - 1,4 - cyclohexylenedimethylbis(3 - bromopropionylurethan)
(9) 1,1,3,3 - tetramethylcyclobutane-2,4-diylbis(3-bromopropionylurethan)
(10) 2,2'-oxydiethylbis(3-bromopropionylurethan)
(11) 2,2'-thiodiethylbis(3-bromopropionylurethan)
(12) 2,2'-sulfonyldiethylbis(3-bromopropionylurethan)
(13) 3,6 - dithiaoctane-1,8-diylbis(3-bromopropionylurethan)
(14) 6 - oxa-3,9-dithiaundecane-1,11-diylbis(3-bromopropionylurethan)
(15) N,N'-bis(3-bromopropionylcarbamoyl)piperazine
(16) N,N'-bis(3-bromopropionylcarbamoyl)-o-phenylenediamine
(17) N,N'-bis(3-bromopropionylcarbamoyl)-N,N'-dimethyl-2-butenediamine
(18) N,N'-bis(3-bromopropionylcarbamoyl)-1,4-cyclohexanebis(methylamine)
(19) N,N' - bis(3-bromopropionyl)-N,N'-dimethyl-2-butenediamine
(20) 1,15 - dibromo-3,5,11,13-tetraoxo-6-oxa-4,10,12-triazapentadecane.

It is to be understood that the hardeners in accordance with the invention may be employed in various photographic emulsions, photographic systems and in emulsions containing various chemical sensitizers and addenda. Various types of emulsions and addenda which may be used in conjunction with these hardeners and processes in which these emulsions may be used are those referred to in U.S. Patent No. 3,057,723, column 5, line 57 to column 8, line 27.

We claim:

1. A composition of matter comprising gelatin and a hardening amount of compound selected from the group consisting of the following:

A. Bisurethans having the structure $$BrCH_2CH_2CONHCOO-X-OCONHCOCH_2CH_2Br$$

wherein X is selected from the group consisting of $(CH_2)_{2-6}$,

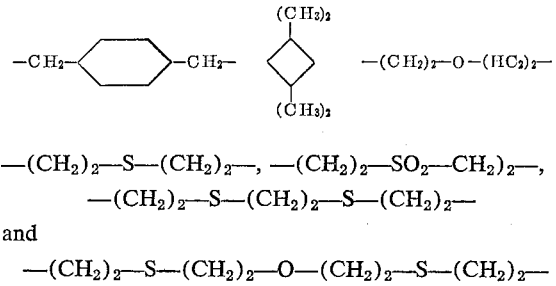

$-(CH_2)_2-S-(CH_2)_2-$, $-(CH_2)_2-SO_2-CH_2)_2-$,
$-(CH_2)_2-S-(CH_2)_2-S-(CH_2)_2-$ and $-(CH_2)_2-S-(CH_2)_2-O-(CH_2)_2-S-(CH_2)_2-$ B. Bisureas having the structure $$(BrCH_2CH_2CONHCO)_2X$$

C. Bisamides having the structure $$(BrCH_2CH_2CO)_2X$$

wherein X in B and in C is selected from the group consisting of

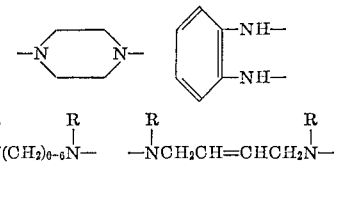

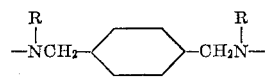

R being selected from the group consisting of H and alkyls of 1–4 carbon atoms, and D. Urethan-ureas having the structure $$BrCH_2CH_2CONHCOOC-X-\overset{R}{\underset{|}{N}}CONHCOCH_2CH_2Br$$

wherein X is selected from the group consisting of $$-(CH_2)_{2-4}-$$

and $$-CH_2\underset{\underset{CH_3}{|}}{CH}-$$

and R is selected from the group consisting of H and alkyls of 1–4 carbon atoms.

2. A composition of matter comprising gelatin and a hardening amount of a bisurethan having the structure $$(BrCH_2CH_2CONHCOO)_2X$$

wherein X is selected from the group consisting of $$-(CH_2)_{2-6}-$$

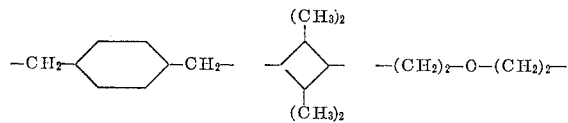

$$-(CH_2)_2-S-(CH_2)_2-,\ -(CH_2)_2-SO_2-CH_2)_2-,$$
$$-(CH_2)_2-S-(CH_2)_2-S-(CH_2)_2$$

and $$-(CH_2)_2-S-(CH_2)_2-O-(CH_2)_2-S-(CH_2)_2-$$

3. A composition of matter comprising gelatin and a hardening amount of a bisurea having the structure $$(BrCH_2CH_2CONHCO)_2X$$

wherein X is selected from the group consisting of

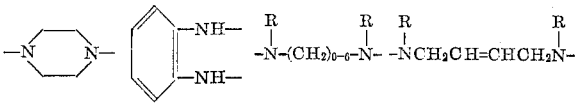

and

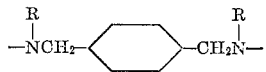

R being selected from the group consisting of H and alkyls of 1–4 carbon atoms.

4. A composition of matter comprising gelatin and a hardening amount of a bisamide having the structure $$(BrCH_2CH_2CO)X$$

wherein X is selected from the group consisting of

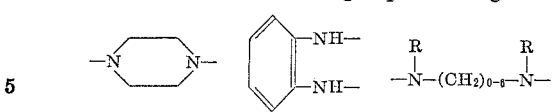

and

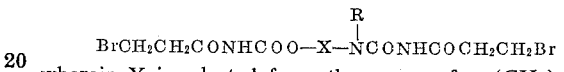

R being selected from the group consisting of H and alkyls of 1–4 carbon atoms.

5. A composition of matter comprising gelatin and a hardening amount of a urethan-urea having the structure $$BrCH_2CH_2CONHCOO-X-\overset{R}{\underset{|}{N}}CONHCOCH_2CH_2Br$$

wherein X is selected from the group of $-(CH_2)_{2-4}-$ and $$-CH_2-\underset{\underset{CH_3}{|}}{CH}-$$

and R is selected from the group of H and the alkyls of 1–4 carbon atoms.

6. A composition of matter comprising gelatin and a hardening amount of N,N'-bis(3-bromopropionyl)hexamethylenediamine.

7. A composition of matter comprising gelatin and a hardening amount of N,N'-bis(3-bromopropionyl)ethylenediamine.

8. A composition of matter comprising gelatin and a hardening amount of N,N'-bis(3-bromopropionyl)phenylenediamine.

9. A composition of matter comprising gelatin and a hardening amount of N,N'-bis(3-bromopropionyl)piperazine.

10. A composition of matter comprising gelatin and a hardening amount of ethylene bis(3-bromopropionyl)urethan.

References Cited by the Examiner
UNITED STATES PATENTS 3,038,804   12/1962   Knox et al. _____ 96—111
3,106,468   10/1963   Burness _____ 96—111

NORMAN G. TORCHIN, *Primary Examiner.*

A. E. TANENHOLTZ, J. H. RAUBITSCHEK,
*Assistant Examiners.*